United States Patent
Morrison et al.

(10) Patent No.: US 6,470,408 B1
(45) Date of Patent: Oct. 22, 2002

(54) APPARATUS AND METHOD FOR DELIVERING INTERRUPTS VIA AN APIC BUS TO IA-32 PROCESSORS

(75) Inventors: John A. Morrison; Robert J. Blakely; Leo J. Embry; Michael S. Allison, all of Ft. Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/292,131

(22) Filed: Apr. 14, 1999

(51) Int. Cl.[7] .............................................. G06F 13/24
(52) U.S. Cl. ...................................................... 710/268
(58) Field of Search ................................ 710/260–269; 709/100, 105, 201

(56) References Cited

U.S. PATENT DOCUMENTS

| | | | |
|---|---|---|---|
| 5,428,799 A | | 6/1995 | Woods et al. ............... 395/725 |
| 5,530,891 A | * | 6/1996 | Gephardt |
| 5,560,018 A | | 9/1996 | Macon, Jr. et al. ......... 395/733 |
| 5,745,772 A | | 4/1998 | Klein ........................ 395/739 |
| 5,862,366 A | * | 1/1999 | Shmidt et al. |
| 5,983,304 A | * | 11/1999 | Jin ............................ 710/129 |
| 6,065,088 A | * | 5/2000 | Bronson et al. ............ 710/263 |
| 6,158,015 A | * | 12/2000 | Klein ............................ 714/2 |
| 6,219,737 B1 | * | 4/2001 | Chen et al. .................. 710/129 |
| 6,219,741 B1 | * | 4/2001 | Pawlowski et al. ......... 710/260 |
| 6,253,304 B1 | * | 6/2001 | Hewitt et al. .................. 712/6 |
| 6,256,699 B1 | * | 7/2001 | Lee ............................. 710/126 |

FOREIGN PATENT DOCUMENTS

| | | | |
|---|---|---|---|
| WO | WO 94/08313 | 4/1994 | ............ G06F/15/80 |
| WO | WO 96/00940 | 1/1996 | ............ G06F/9/46 |

* cited by examiner

Primary Examiner—Paul R. Myers

(57) ABSTRACT

An apparatus and a method are provided to distribute interrupts from a system bus to Intel® Architecture (IA)-32 applications processors. The apparatus includes a bridge that couples a processor bus to the system bus. In addition, the bridge is coupled to an advanced programmable interrupt controller (APIC) by an APIC bus. The bridge monitors the system bus for interrupts and converts selected interrupt transactions into APIC messages. The bridge then sends the APIC messages to the APIC bus. Each of the applications processors is also coupled to one of many APIC buses. The applications processor that is the target of the interrupt transaction receives the APIC message and executes an interrupt handler routine. The apparatus and method also incorporate interrupt transaction buffering and throttling.

20 Claims, 3 Drawing Sheets

APPARATUS AND METHOD FOR DELIVERING INTERRUPTS VIA AN APIC BUS TO IA-32 PROCESSORS

TECHNICAL FIELD

The invention is directed to an apparatus and a method that distributes interrupts. In particular, the invention is directed to an apparatus and a method that converts interrupt transactions on a system bus into interrupt mechanisms supported by Intel® Architecture (IA-32) processors.

BACKGROUND ART

Multiprocessor computers implement varying levels of symmetry. Master-slave processor computer systems are very. asymmetric, whereas in computers designed with higher levels of symmetry, each of the working processors are capable of performing the same functions. In symmetric computers, the working processors share buses, address the same memory and basic input/output system (BIOS) resources, and receive the same array of interrupts. However, in current computer systems, no mechanism exists to distribute interrupts to an IA-32processor when mixed with an IA-64 architecture.

SUMMARY OF INVENTION

A computer system provides a mechanism to distribute interrupts from a system bus to Intel® Architecture (IA-)32 processors. The system includes a number of applications processors that are coupled together by an advanced programmable interrupt controller (APIC) bus and by an advanced processor bus. As many as four applications processors can be so coupled. A bridge couples the processor bus and the APIC bus to the system bus. The bridge translates interrupt transactions between the applications processors and the system bus.

The system may include any number of applications processors and bridges. A combination of up to four applications processors and a bridge forms a node. The nodes are coupled together on the system bus. Each applications processor has a unique address related to a nodeID of the processor and a further processor ID. In an improvement over current computer architectures, more than sixteen applications processors may be included in the system.

The system uses the above-described architecture to assert, acknowledge and process the interrupts. Interrupts are forced transfers of execution from a currently running program or task to a special program or task called an interrupt handler. Each of the applications processors may be provided with an interrupt handler in software. Each also may be provided with an APIC to process the interrupts. The applications processors can receive interrupts from other applications processors, or from external devices, such as a keyboard, for example. The source of the interrupt determines some features of the interrupt handling.

In an embodiment, the system uses a bridge to convert interrupt transactions on the system bus into APIC messages that are delivered to a target APIC bus. The bridge monitors the system bus and determines when a particular interrupt transaction is directed to an applications processor at the bridge's node. The bridge may acquire the interrupt transaction, convert the interrupt transaction to an APIC message and send the APIC message to the appropriate applications processor over the APIC bus.

For external interrupts, when the applications processor is able to receive the interrupt, the applications processor will return an interrupt acknowledge over the processor bus. The bridge then provides the interrupt acknowledge to the system bus and the device that generated the external interrupt returns the interrupt vector. With the interrupt vector, the applications processor is able to acquire the interrupt and to execute it using the interrupt handler.

Normal interrupts are delivered to the applications processor as APIC messages over the APIC bus. Since normal interrupts include the interrupt vector, the applications processor does not have to generate an interrupt acknowledge transaction to acquire the vector.

The system also incorporates advanced features of interrupt buffering and interrupt throttling. For example, a bridge may buffer interrupt transactions for an applications processor that cannot currently accept an interrupt because, for example, the applications processor is currently processing an interrupt.

Interrupts may originate from external programmable interrupt controllers. In this operating mode, the interrupts may be delivered as external interrupt transactions. The bridge forwards an interrupt acknowledge from the applications processor to the system bus to obtain the interrupt vector.

BRIEF DESCRIPTION OF DRAWINGS

The invention will be described with reference to the following drawings in which like numerals refer to like objects, and wherein.

DISCLOSURE OF INVENTION,

BEST MODE FOR CARRYING OUT INVENTION, INDUSTRIAL APPLICABILITY, AND

DETAILED DESCRIPTION OF INVENTION

Multi-processor computer systems may have a mechanism for distributing interrupts to the processors. Interrupts are forced transfers of execution from a currently running program or task to a special program or task called an interrupt handler. Interrupts may occur at random times during the execution of a program, in response to signals from hardware, for example. These interrupts are used to handle events that occur external to a processor. An example is a power failure. Interrupts may also be generated by software.

The processors in the computer system may include an interrupt handling mechanism that allows the interrupts to be handled in a manner that is transparent to the application program that is running on the processor. When an interrupt is received, the currently running application program is automatically suspended while the processor executes an interrupt handling sequence. When execution of the interrupt is completed, the processor may return to execution of the suspended application program. The resumption of the interrupted application program happens without loss of application program continuity, unless the interrupt caused the application program to be terminated.

In a multi-processor environment, the computer system may address interrupts to a desired processor for execution.

This may require a mechanism for locating each of the processors, transmitting the interrupts, and in some cases buffering and throttling the interrupts and receiving interrupt acknowledge signals from the processors. The interrupt mechanism is complicated when components with different architectures are used in the same computer system.

Figure 1:
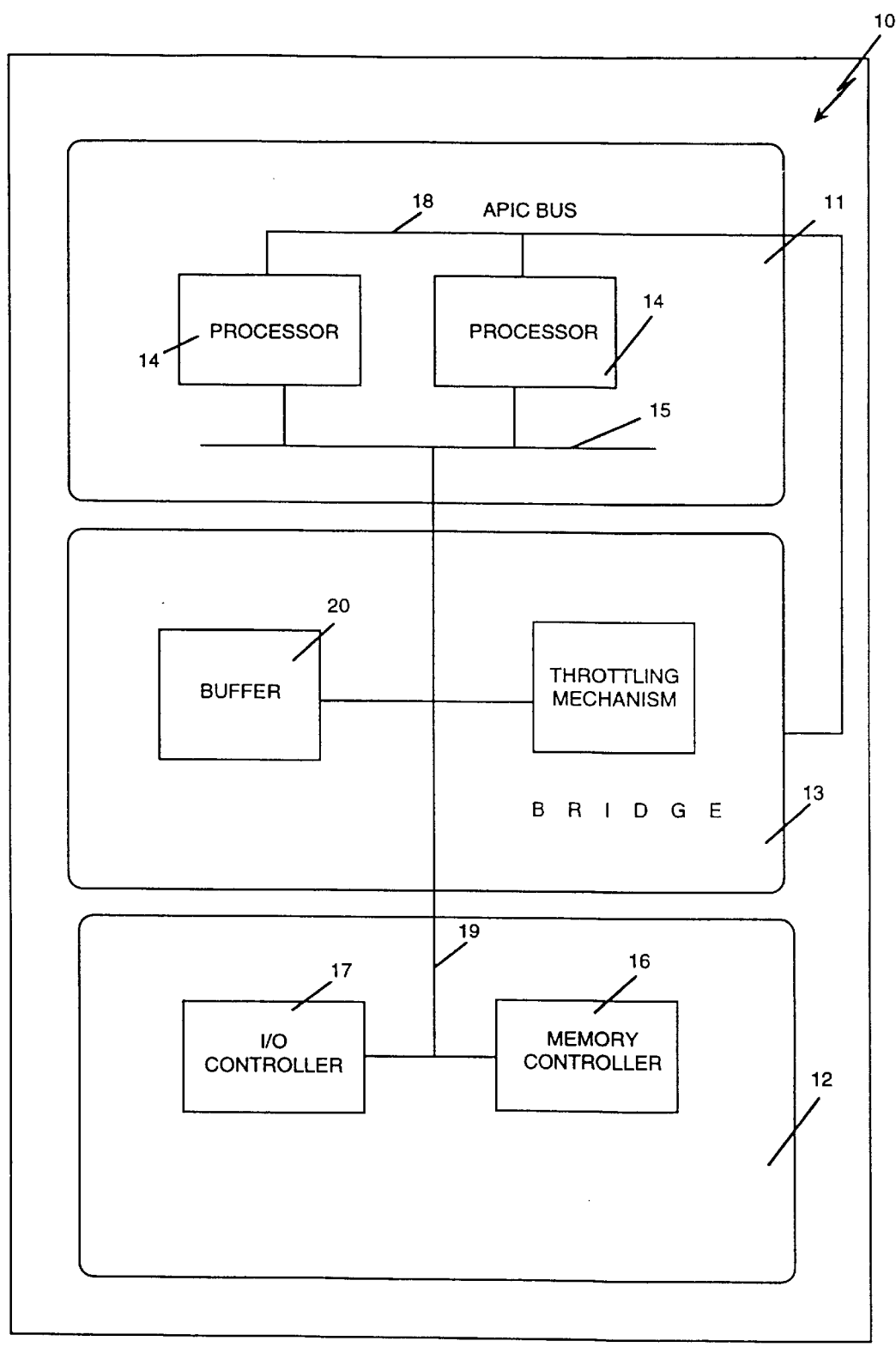
FIG. 1 is a block diagram of a computer architecture used to distribute interrupts.

FIG. 1 shows a system 10 that may be used to distribute interrupts in a personal computer or server application. The system 10 includes an Intel® Architecture (IA-)32 processor system 11 coupled to system components 12 by a bridge 13. The IA-32 processor system 11 may include one or more parallel processors 14 that perform various computing functions. The processors 14 are coupled to a common bus 15, and may be coupled to a local advanced programmable interrupt controller (APIC) bus 18. The processors 14 share access to the common bus 15, and may also share other resources such as memory, input/output (I/O) devices, and interrupt handlers, for example. The system components 12 provide enhanced functionality, and can be used with the existing IA-32 processors 14, provided that appropriate hardware and/or software is used to ensure compatibility between the IA-32 processor system 11 and the system components 12. For example, the system components 12 may include a system bus 19 coupled to a memory controller 16 and an I/O controller 17, all of which are designed for use with an IA-64 architecture. The resulting system 10 may require special mechanisms to distribute interrupts. The bridge 13 may be part of the special mechanism. The bridge 13 may include a buffer 20 for storing interrupt transactions and a throttling mechanism to prevent buffer overflow. To ensure optimum performance, the bridge 13 may be implemented in a VLSI, for example.

Figure 2:
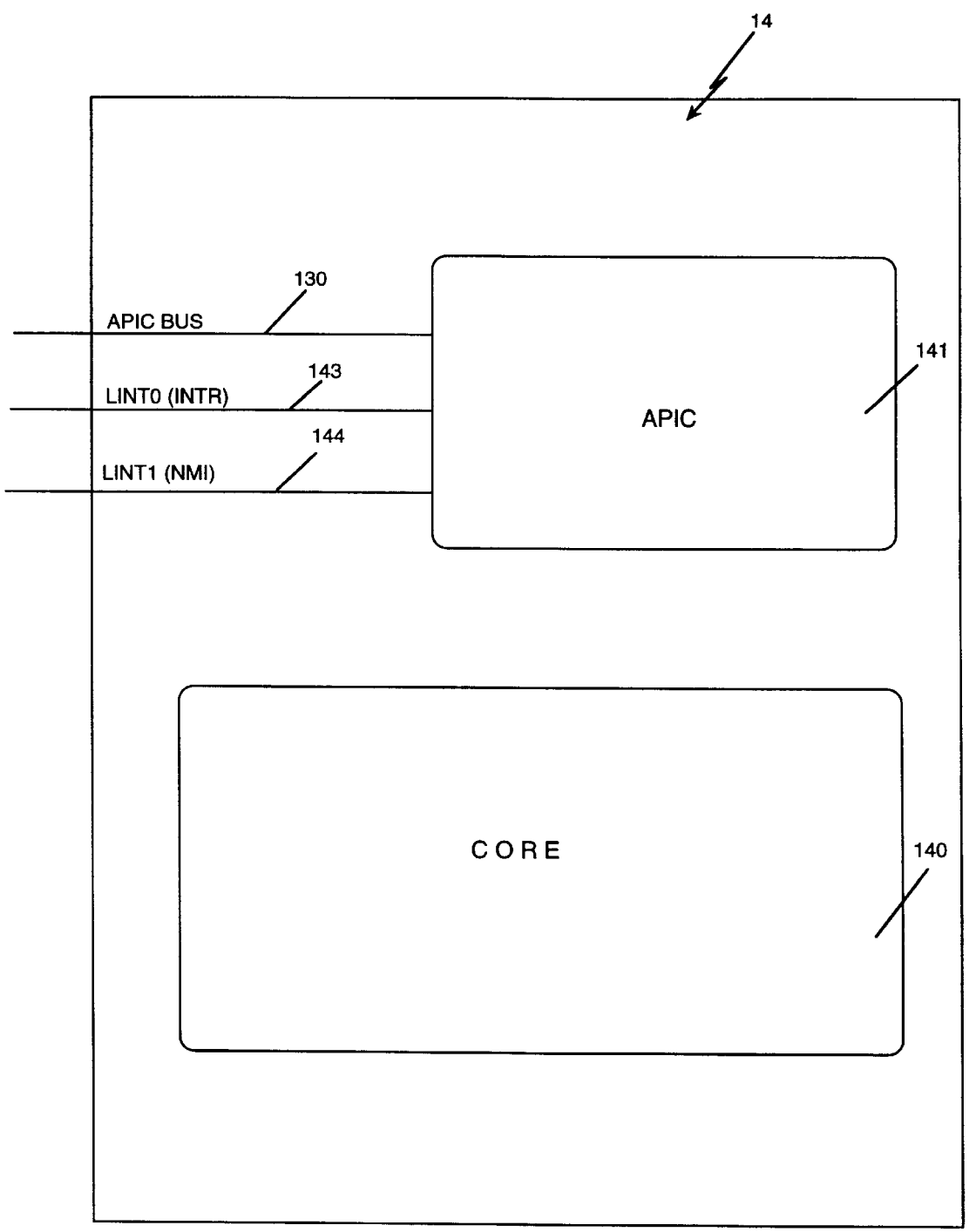
FIG. 2 is a block diagram of an IA-32 processor in the computer architecture of FIG. 1.

FIG. 2 is a block diagram of the IA-32 processor 14 used in the system 10 of FIG. 1. The processor 14 includes a core 140 that controls processing on the processor 14. The processor 14 may be an IA-32 processor. An APIC 141 processes local external and normal interrupts that the processor 14 may receive at its interrupt pins or at an APIC bus connection, and processes local internal interrupts that software generates. The APIC 141 may include an interrupt priority mechanism (not shown). Such an interrupt priority mechanism is well-known in the art. The APIC 141 may be referred to as a local APIC.

The processor 14 may include one or more pins, such as pins 143 and 144 which may be used to assert an interrupt to the processor 14.

Figure 3:
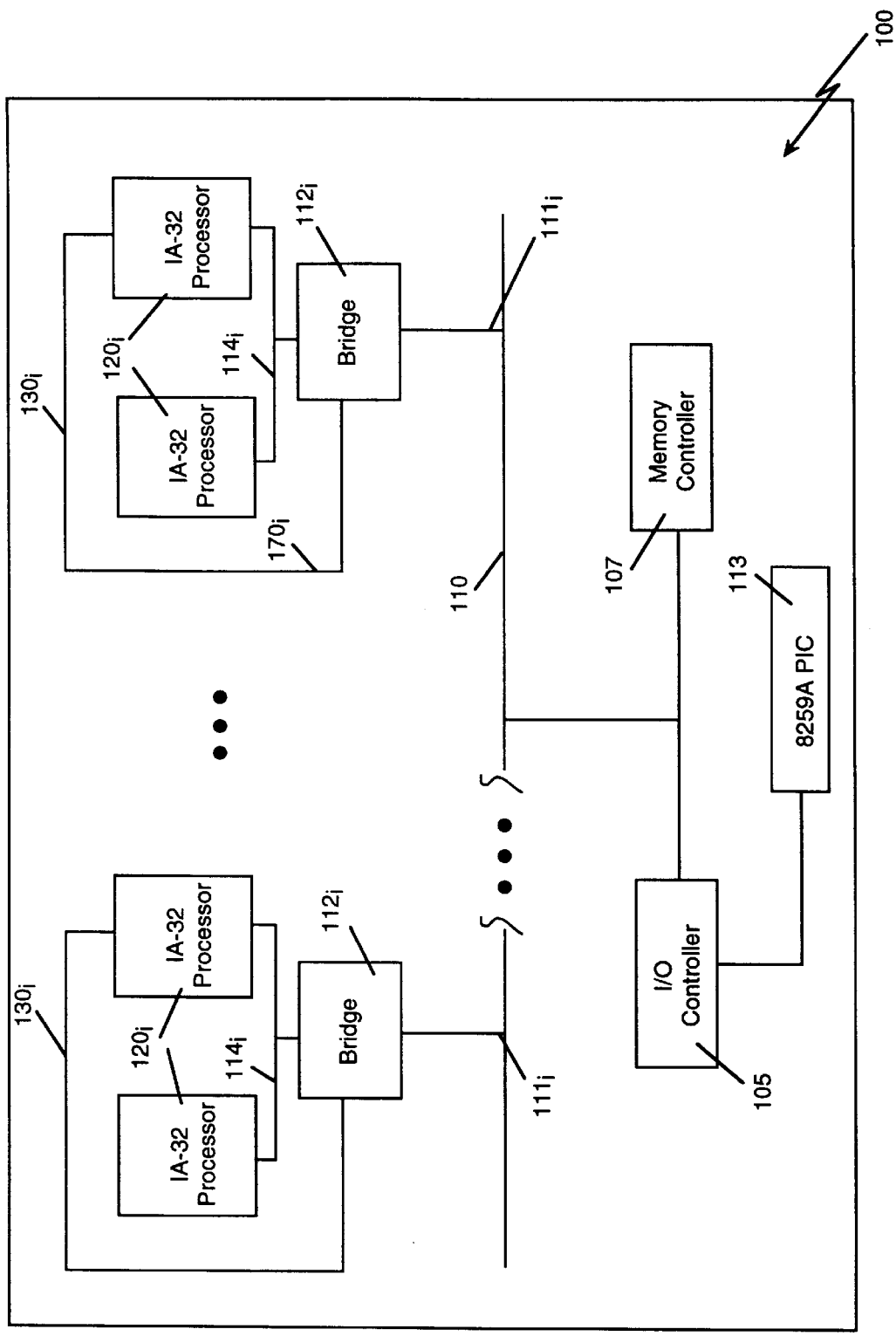
FIG. 3 illustrates a mixed IA-32 and IA-64 computer architecture in which a bridge is used to distribute interrupts.

FIG. 3 shows an overall computer architecture 100 that includes IA-32 processors. System components include one or more I/O controllers 105, which are coupled to a memory controller 107. The I/O controllers 105 are coupled to I/O device bus 109. The bus 109 may be peripheral computer interface (PCI) bus, for example. The bus 109 may connect standard computer peripherals such as monitors and keyboards, for example. The bus 109 may also be used to signal interrupts from external devices. The external interrupts may be delivered by a standard programmable interrupt controller (PIC) such as an Intel® 8259A PIC 13, for example.

A system bus 110 connects the memory controller 107 and other components to IA-32 processors $120_i$ via bridges $112_i$, and processor buses $114_i$. Each bridge $112_i$ is coupled to one or more IA-32 processors $120_i$ via a local APIC bus $130_i$.

The IA-32 processors $120_i$ and the bridges $112_i$ are grouped at nodes $111_i$. In FIG. 3, two IA-32 processors $120_i$ are shown connected at each of the nodes $111_i$. However, only one IA-32 processor $120_i$, or more than two IA-32 processors $120_i$ (e.g., up to four) may be connected at each of the nodes $111_i$. Also in FIG. 3, sixteen IA-32 processors $120_i$ are shown coupled to the system components. However, the computer architecture 100 can support more than sixteen IA-32 processors $120_i$.

The bridge $112_i$ takes the interrupts that are being delivered over the system bus 110 and signals the interrupt to the appropriate IA-32 processor $120_i$. To ensure that a particular interrupt reaches the appropriate IA-32 processor $120_i$, all interrupt transactions on the system bus 110 contain target node 111, and IA-32 processor $120_i$ identification. Each bridge $112_i$ monitors the system bus 110 to determine if an interrupt transaction on the system bus 110 is addressed to one of the IA-32 processors $120_i$ on the bridge's node $111_i$. That is, when an interrupt transaction is presented on the system bus 110, each of the bridges $112_i$ examines a destination ID field in the interrupt transaction. This field contains a nodeID and a processor ID. The bridge $112_i$ whose nodeID matches the nodeID of the interrupt transaction will accept and track the interrupt.

Software may initialize the I/O devices to transfer an interrupt transaction in a manner that encodes the identification of the IA-32 processor $120_i$ to be interrupted. The bridge $112_i$ that is connected to the same IA-32 bus $114_i$ as the destination IA-32 processor $120_i$ recognizes the interrupt transaction, converts the interrupt transaction into an APIC message, and sends the APIC message to the targeted IA-32 processor $120_i$ on the APIC bus $130_i$. Since more than one interrupt could be dedicated to a node, the bridge $112_i$ may buffer or throttle the interrupt transactions.

If the interrupt is a normal interrupt, the interrupt vector is supplied with the interrupt transaction. If the interrupt is an external interrupt, the interrupt vector is not supplied. Therefore, upon receiving an APIC message for an external interrupt, the targeted IA-32 processor $120_i$ generates an interrupt acknowledge transaction requesting the interrupt vector. The bridge $112_i$ forwards the interrupt acknowledge transaction to the system bus 110, which will then supply the interrupt vector, allowing the interrupt handler in the IA-32 processor $120_i$ to be executed.

Interrupts may originate from a pair of cascaded 8259A PICs, for example. The IA-32 processor $120_i$ may produce an interrupt acknowledge transaction to obtain the vector from the 8259A PIC. In an alternative method, the targeted bridge $112_i$ could recognize that the interrupt transaction is for an 8259-type interrupt, directly issue the interrupt acknowledge and obtain the interrupt vector prior to issuing the APIC message on the APIC bus $130_i$. In this way, the interrupt sequence on the APIC bus $130_i$ is identical regardless of the type of interrupt, because the bridge $112_i$ will always already have the interrupt vector.

Alternatively, when the targeted IA-32 processor $120_i$ issues an interrupt acknowledge in response to an 8259-type interrupt, the targeted bridge $112_i$ forwards the interrupt acknowledge transaction onto the system bus 110, and returns the resulting interrupt vector to the IA-32 processor $120_i$ over the IA-32 bus $114_i$.

In the computer architecture 100 shown in FIG. 3, I/O devices may transfer interrupts as transactions on the system bus 110. If an IA-64 architecture is used, interrupts may be delivered with a particular type of transaction on the system bus 110. In a IA-32 architecture, interrupts may be transferred over the APIC bus $130_i$. In a mixed IA-32 and IA-64 architecture, one way to distribute interrupts between the nodes $111_i$ is to use the above-described interrupt mechanism, adapted to be used with the IA-32 processors.

For example, to send an interrupt from an I/O device, which is not on a node, but instead is somewhere off in the system 100, to a IA-32 processor $120_i$, the interrupt may appear as an interrupt transaction on the system bus 110. The interrupt mechanism and interrupt architecture will ensure that the interrupt is delivered to the appropriate IA-32 processor $120_i$.

In the architecture 100 shown in FIG. 3, interrupt transactions are sent to the IA-32 processors $120_i$ over the APIC buses $130_i$. The APIC buses $130_i$ operate at a much slower speed than the system bus 110. The system bus 110 may provide interrupt transactions for a particular IA-32 processor $120_i$ at a much faster rate than the interrupt transaction can be processed over the APIC bus $130_i$.

Returning to FIG. 1, the interrupt architecture for the bridge 13 is shown with interrupt buffer 20. The buffer 20 may partially overcome the above-described problem of mismatched processing speed. For example, when the bridge 13 recognizes a new interrupt transaction to the targeted IA-32 processor 14, the previous interrupt transaction may not have been completely delivered over the APIC bus. As a result, the bridge 13 may have to buffer up interrupts occurring in that interval.

The above-described buffer may be used to store some of these pending interrupt transactions. However, the buffer may reach capacity with more interrupt transactions being provided from the system bus 110. Therefore, the bridges $112_i$ may also throttle interrupt transactions to avoid over filling the buffer. For example, a bridge $112_i$ may monitor the state of its interrupt transaction buffer. When the buffer reaches its capacity for storing interrupt transactions, the bridge $112_i$ may halt transactions on the system bus 110 by initiating a snoop stall, for example. Other throttling mechanisms may also be used in the computer architecture 100 to prevent over filling the interrupt transaction buffer.

One of ordinary skill in the art will recognize that the above description is that of preferred embodiments of the invention and that various changes and modifications may be made thereto without departing from the spirit and scope of the invention as defined in the following claims.

What is claimed is:

1. An apparatus for distributing interrupts in a multi-processor architecture computer system, comprising:
   a system bus that provides interrupts;
   a bridge coupled to the system bus; and
   a plurality of applications processors coupled to the bridge, wherein the system bus supplies the interrupts as interrupt transactions and wherein the bridge reads an interrupt transaction to determine a target applications processor, converts the interrupt transaction into an interrupt message, and supplies the interrupt message to the target applications processor, wherein the interrupt transaction includes an applications processor identification and wherein the bridge identifies the target applications processor by reading the applications processor identification.

2. The apparatus of claim 1, further comprising:
   a processor bus coupled to the bridge and the plurality of applications processors; and
   an advanced programmable interrupt (APIC) bus coupled to the plurality of applications processors, wherein the bridge supplies the interrupt message to the APIC bus.

3. The apparatus of claim 1, wherein the bridge formats the interrupt message as an APIC message.

4. The apparatus of claim 1, wherein the bridge, comprises:
   a buffer that stores the interrupt transactions for delivery to an applications processor;
   a throttling mechanism that prevents the system bus from suppling interrupt transactions for a given applications processor when the buffer is full.

5. The apparatus of claim 1, wherein the bridge converts the interrupt transaction into an appropriate APIC message.

6. The apparatus of claim 5, wherein when the bridge provides the APIC message for the external interrupt, the target applications processor returns an interrupt acknowledge to the bridge and the bridge returns the interrupt acknowledge to the system bus.

7. The apparatus of claim 1, wherein the interrupt transaction includes an applications processor identification and wherein the bridge identifies the target applications processor by reading the applications processor identification.

8. The apparatus of claim 1, wherein the system bus is coupled to an IA-64 component and the applications processors are IA-32 components.

9. A method for distributing interrupts in a computer system, comprising:
   receiving an interrupt transaction indicating a pending interrupt at a system bus;
   reading the interrupt transaction by a plurality of bridges to determine a target applications processor from a plurality of applications processors, wherein the reading step comprises identifying the target applications processor by reading an identification of the target applications processor included in the interrupt transaction;
   transferring the interrupt transaction to a bridge, wherein the bridge is coupled to one or more applications processors by a processor bus;
   converting the transferred interrupt transaction into an interrupt message; and
   sending the interrupt message to the target applications processor over an APIC bus.

10. The method of claim 9, wherein the reading step, comprises:
    identifying the target applications processor by reading an identification of the target applications processor included in the interrupt transaction.

11. The method of claim 9, wherein the interrupt message is an APIC message.

12. The method of claim 9, wherein the interrupt transaction corresponds to an external interrupt, the method further comprising:
    returning an interrupt acknowledge from the target applications processor to the processor bus in response to the interrupt message;
    providing the returned interrupt acknowledge from the bridge to the system bus; and
    providing the interrupt vector in response to the returned interrupt acknowledge on the system bus.

13. The method of claim 9, wherein the target applications processor is targeted by more than one interrupt, further comprising:
    buffering a subsequent interrupt transaction in a buffer until completion of delivering a prior interrupt in the target applications processor on the APIC bus.

14. The method of claim 13, wherein the target applications processor is targeted by more than one interrupt, further comprising:
    throttling the system bus when a capacity of the buffer will be exceeded.

15. The method of claim 9, wherein the applications processors are IA-32 processors and wherein the computer system comprises IA-64 architecture components.

16. A system for distributing interrupts, comprising:

a system bus;

an input/output (I/O) controller coupled to the system bus, wherein the I/O controller receives interrupts from devices and issues the interrupts on the system bus;

a bridge coupled to the system bus;

a processor bus coupled to the bridge;

applications processors coupled to the processor bus; and and advanced programmable interrupt controller (APIC) bus coupled to the applications processor and the bridge, wherein the bridge converts interrupt transactions into APIC messages and provides the APIC messages on the APIC bus, and wherein the bridge determines a target applications processor to receive an APIC message by reading an applications processor identification and a node identification included in an interrupt transaction.

17. The system of claim 16, wherein the bridge comprises:

a buffer that stores pending interrupt transactions; and a throttle that limits interrupt transactions on the system bus.

18. The system of claim 16, wherein the bridge converts interrupt transactions into APIC messages and provides the APIC messages on the APIC bus.

19. The system of claim 18, wherein the bridge determines a target applications processor to receive an APIC message by reading an applications processor identification and a node identification included in the interrupt transaction.

20. The system of claim 16, wherein the applications processors are IA-32 processors and wherein the system comprises IA-64 architecture components.

* * * * *